United States Patent Office 2,722,482
Patented Nov. 1, 1955

2,722,482

PROCESS FOR MAKING CONDIMENT

Arthur W. Betts, West New York, N. J., assignor to Smoked Foods Research Institute, Inc., Palisades Park, N. J., a corporation of New Jersey No Drawing. Application September 8, 1952,
Serial No. 308,519

5 Claims. (Cl. 99—140)

This invention relates to a process of precipitating and collecting the flavoring and preserving ingredients from vegetable matter for the purpose of producing a condiment, which may be added to food products to obtain a smoky taste and which also may be applied as a coating enrobing same as desired.

Heretofore, the production of smoked food products, has been carried out by directly subjecting the same to smoke generated by the partial combustion of vegetable materials, such as certain woods and leaves, berries and needles of same. This process often took a long time and required considerable handling, thus greatly increasing the cost of the product. It was also very difficult properly to control the temperature, smoke density, smoke penetration, etc. and as a result the food products were often under-done or over-done or even completely spoiled. To eliminate these difficulties and thereby to reduce the cost of the final products, to eliminate waste and to insure a more uniform product, I have invented a process of producing a condiment, which may be mixed with the food product when the product is in a suitable form, or which may be injected into the product, or applied as a coating over same.

The main object of my invention is to produce a condiment which will eliminate the use of smoke in the treatment of food products.

Another object of my invention is to produce a condiment that may be mixed in with any comminuted foods, such as sausages, etc. to give the desired smoky taste and to help preserve the food.

A further object of my invention, is to produce a condiment by the precipitation and distillation of smoke from the vegetable matter, which may be directly applied to food products, whereby eliminating handling and resulting in a lower cost.

An ancillary object of my invention is to produce a condiment from the ingredients of smoke from vegetable matter, which may be injected into solid food products, such as meat and applied as an outside coating of same thereby accomplishing both flavoring and preservation of the food product.

Other objects and advantages of my invention will be apparent from the following description and claims.

In the actual production of the ingredients of my condiment, I will use one of four well known chemical and physical processes or a combination of these as follows:

A. Precipitation of the carbonaceous or gaseous product of the incomplete combustion or partial distillation of vegetable materials, by means of the use of high voltage static electrical force precipitation.

B. Fractionated distillation of the smoke from the vegetable material including its fume, by means of treating the precipitated or collected product chemically.

C. Passing the said gaseous and solid particles emanating from the incomplete combustion or partial distillation of said vegetable matter over cold plates, causing their watery and oily matter to congeal and entrap the desired flavorsome and preservative fractions.

D. Entrapping the desired fraction of the products of the incomplete combustion or fractional distillation of said vegetable materials by adding a mist of flavorless oil to the stream of smoke whereby the desirable fractions of the smoke are adsorbed upon the fine particles of the oil mist whereupon said oil mist with the fraction is precipitated.

After precipitating and collecting the flavoring and preserving ingredients by one of the four aforementioned processes, or a combination of same, I mix the condiment with a suitable carrier or other condiments desired for flavoring the product. In the case of sausages this may be mustard, salt, pepper, etc. The finished condiment is then supplied in the form of a paste, or sauce, which may be mixed with the ground food product or coated and enrobed on the same as the case may be.

It is to be understood that modifications of my process may be made by a chemist skilled in the art, without departing from the scope of my invention or the attainable results of same.

Having thus described my invention, I claim:

1. The process of producing a condiment by the following steps, extracting the desirable portions of the product of the incomplete combustion of vegetable matter by high voltage precipitation, collecting said desirable products on a cold surface covered with a deflavored oil, collecting said resulting products from said plate and mixing same with the usual condiments to produce a sauce.

2. The process of producing a condiment as described in claim 1, and applying same to ground food products by mixing with the comminuted materials before same are made into their final form.

3. The process of producing a condiment as described in claim 1, and applying same to solid protein food products by means of injection into the same, thereby obtaining the flavoring and preservation of said food products.

4. The process of producing a condiment as described in claim 1, and applying same to food products, by enrobing said products with a coating of said condiment, thereby obtaining flavoring and preservation of said products.

5. The process of producing a condiment by the following steps, producing smoke by the incomplete combustion of vegetable matter, mixing the smoke with a mist of flavorless oil, letting the flavoring and preserving ingredients of said smoke adsorb upon the particles of the oil mist and precipitating the said oil particles.

References Cited in the file of this patent

UNITED STATES PATENTS

| | | |
|---|---|---|
| 1,719,354 | Alsop | July 2, 1929 |
| 1,777,026 | Alsberg | Sept. 30, 1930 |
| 1,882,904 | Reid | Oct. 18, 1932 |
| 2,129,047 | Colgin | Sept. 6, 1938 |
| 2,333,505 | Allen | Nov. 2, 1943 |
| 2,565,454 | MacKenzie et al. | Aug. 21, 1951 |

FOREIGN PATENTS

| | | |
|---|---|---|
| 411,006 | Great Britain | May 31, 1934 |